(12) United States Patent
Bortun et al.

(10) Patent No.: US 10,675,617 B2
(45) Date of Patent: Jun. 9, 2020

(54) HIGH CAPACITY ADSORBENT FOR FLUORIDE ION AND OXYANIONS OF PHOSPHOROUS AND ARSENIC AND METHOD FOR MAKING THE SAME

(71) Applicant: Graver Technologies LLC, Glasgow, DE (US)

(72) Inventors: Anatoly Bortun, Middletown, DE (US); James Knoll, Glen Gardner, NJ (US); Katie Henderson, Smyrna, DE (US)

(73) Assignee: Graver Technologies LLC, Glasgow, DE (US)

( * ) Notice: Subject to any disclaimer, the term of this patent is extended or adjusted under 35 U.S.C. 154(b) by 0 days.

(21) Appl. No.: 16/287,597

(22) Filed: Feb. 27, 2019

(65) Prior Publication Data

US 2019/0193070 A1 Jun. 27, 2019

Related U.S. Application Data

(60) Continuation of application No. 15/820,633, filed on Nov. 22, 2017, which is a division of application No. 14/943,580, filed on Nov. 17, 2015.

(60) Provisional application No. 62/084,118, filed on Nov. 25, 2014.

(51) Int. Cl.
| | |
|---|---|
| *B01J 41/10* | (2006.01) |
| *B01J 20/30* | (2006.01) |
| *B01J 20/06* | (2006.01) |
| *B01J 20/08* | (2006.01) |

(52) U.S. Cl.
CPC .............. *B01J 41/10* (2013.01); *B01J 20/06* (2013.01); *B01J 20/08* (2013.01); *B01J 20/30* (2013.01); *B01J 2220/42* (2013.01)

(58) Field of Classification Search
None
See application file for complete search history.

(56) References Cited

U.S. PATENT DOCUMENTS

| | | | |
|---|---|---|---|
| 3,650,793 A | | 3/1972 | Goodspeed et al. |
| 3,896,049 A | * | 7/1975 | Dworak ............. B01J 20/28014 208/251 H |
| 4,935,146 A | | 6/1990 | O'Neill et al. |
| 5,876,606 A | | 3/1999 | Blowes et al. |
| 6,030,537 A | | 2/2000 | Shaniuk et al. |
| 6,077,809 A | | 6/2000 | Suzuki et al. |

(Continued)

FOREIGN PATENT DOCUMENTS

| | | |
|---|---|---|
| CN | 2528078 | 12/2002 |
| WO | WO 2013/192394 | 12/2013 |

*Primary Examiner* — Joseph D Anthony
(74) *Attorney, Agent, or Firm* — DeLio Peterson & Curcio LLC; Robert Curcio

(57) ABSTRACT

An alumina-based adsorbent and method of making exhibiting high affinity and capacity towards fluoride ions and oxyanions of phosphorus and arsenic in a broad pH range and presence of large excess of competitive ions. Alumina based adsorbent is a mixed oxide of alumina existing in tetra-, penta-, and octahedral coordination at specific ratio, and oxides of polyvalent metals of elements titanium, zirconium, tin, cerium, lanthanum, iron, or combinations thereof. The alumina based adsorbent may be used for selective removal of fluoride ion and oxyanions of phosphorus and arsenic from drinking water, industrial streams and wastes, in medicine and food industry.

10 Claims, 2 Drawing Sheets

(56) References Cited

U.S. PATENT DOCUMENTS

| | | |
|---|---|---|
| 6,383,395 B1 | 5/2002 | Clarke et al. |
| 6,599,429 B1 | 7/2003 | Azizian |
| 6,830,695 B1 | 12/2004 | Brandy et al. |
| 6,878,283 B2 | 4/2005 | Thompson |
| 6,919,029 B2 | 7/2005 | Meng et al. |
| 7,033,498 B2 | 4/2006 | Wong |
| 7,135,156 B2 | 11/2006 | Hai et al. |
| 7,186,671 B2 * | 3/2007 | Smith ................. C02F 1/50 210/680 |
| 7,252,767 B2 | 8/2007 | Bortun et al. |
| 7,473,369 B2 | 1/2009 | Meng et al. |
| 7,497,952 B2 | 3/2009 | Meng et al. |
| 7,625,487 B2 | 12/2009 | Crawford et al. |
| 7,786,038 B2 * | 8/2010 | Yang ................. B01J 20/041 502/302 |
| 8,002,726 B2 | 8/2011 | Karoor et al. |
| 8,216,543 B2 | 7/2012 | Chen et al. |
| 8,404,210 B2 | 3/2013 | Hussam |
| 2005/0274646 A1 | 12/2005 | Lawson et al. |
| 2008/0254978 A1 | 10/2008 | Kikuchi et al. |
| 2009/0169645 A1 | 7/2009 | Muller et al. |
| 2009/0305883 A1 | 12/2009 | Rayalu et al. |
| 2010/0004588 A1 | 1/2010 | Yeh et al. |
| 2010/0038285 A1 | 2/2010 | Antonio et al. |
| 2010/0078387 A1 | 4/2010 | Wong |
| 2013/0316018 A1 | 11/2013 | Kaufmann et al. |
| 2014/0260214 A1 | 9/2014 | Xue et al. |

* cited by examiner

HIGH CAPACITY ADSORBENT FOR FLUORIDE ION AND OXYANIONS OF PHOSPHOROUS AND ARSENIC AND METHOD FOR MAKING THE SAME

BACKGROUND OF THE INVENTION

1. Field of the Invention

This invention relates to a filtration media, and more specifically to a high capacity adsorbent and the fabrication thereof. The high capacity adsorbent includes enhanced performance towards fluoride ion and oxyanions of arsenic and phosphorus in a broad pH range in the presence of high excess of competitive ions. A high capacity adsorbent is useful for the selective removal of fluoride ion and oxyanions of phosphorus and arsenic from drinking water, industrial streams and wastes, in the medicine and food industries.

2. Description of Related Art

Ion exchange properties of insoluble polyvalent metal hydroxides have been studied since the 1950's [C. B. Amphlett, *Inorganic Ion Exchangers*, Elsevier, New York (1964)]. It was found that some of these hydroxides (aluminum hydroxide, ferric hydroxide, titanium hydroxide, zirconium hydroxide, and the like) are amphoteric and behave as cation exchangers or anion exchangers depending on pH.

Fluoride is considered an essential element for animals and humans because of the role it plays in bone and dentin mineralization. However, when fluoride is present in excess of 1.5 mg/L it affects teeth, endocrine glands, liver and other organs. Presently, the World Health Organization recognizes activated alumina (AA) adsorption as one of the best adsorbents for water defluoridation. A number of studies on AA performance in water defluoridation under varying process conditions have shown that the optimum pH for maximum adsorption is between 5 and 7. The capacity of the activated alumina on fluoride depends on the AA preparation route, crystalline form, and can vary from 1 to 20 mg/g, depending on the operating conditions [A. Bhatnagar et al, *Fluoride removal from water by adsorption—A review*, Chemical Engineering Journal, 171, p. 811-840, (2011)]. Other types of polyvalent metal oxides also have ability to remove fluoride ion, but their efficiency typically is lower than that of AA. Granular ferric hydroxide (GFH) demonstrates capacity on fluoride of approximately 7 mg/g at a pH of approximately 6-7; hydrous titania and zirconia have similar poor performance (U.S. Pat. No. 6,077,809, demonstrating capacity of approximately 5 mg F/g at a pH of approximately 3). Some binary polyvalent mixed oxides have been tested as potential adsorbents for fluoride. It was found that alumina-titania oxide has a capacity of approximately 3 mg F/g; zirconia-iron oxide having a capacity of approximately 10 mg F/g; and alumina-iron oxide having a capacity up to 4 mg F/g. (See, for example, U.S. Pat. No. 6,599,429). Alumina-ceria oxide has high capacity on fluoride up to 90 mg/g at a pH of 6, but the high cost of cerium makes this material cost-prohibitive for water defluoridation.

Polyvalent metal based hydrous oxides show high affinity towards oxyanions of phosphorus and arsenic. Zirconium hydrous oxide has been used for phosphate removal in kidney dialysis. (See, e.g., U.S. Pat. Nos. 6,878,283; 7,033,498; 7,135,156; 8,002,726; and U.S. Patent Publication No. 2010/0078387). It has been shown that zirconium oxide capacity on phosphorus from blood dialysate can reach 90-120 mg $PO_4$/g. High affinity of iron oxides to $PO_4$ allows their use for water treatment (Ref. U.S. Pat. No. 5,876,606), as well as for oral administration in humans and animals for hyperphosphatemia prevention (Ref. U.S. Patent Publication Nos. 2009/169645 and 2013/316018).

Aluminum hydroxide was proposed as an adsorbent for arsenic (Ref. U.S. Pat. No. 6,030,537); however, alumina capacity on arsenic is significantly lower than that of hydrous titanium (see, e.g., U.S. Pat. Nos. 6,919,029; 7,473,369; and 7,497,952), zirconium (U.S. Pat. Nos. 6,383,395; 7,252,767; and 6,077,809) and iron oxides (U.S. Pat. Nos. 6,830,695; 7,625,487; and 8,404,210). Moreover, aluminum hydroxides are able to adsorb only arsenic(V) and have no affinity towards arsenic(III). Using polyvalent mixed oxides for selective arsenic removal has been shown demonstrated: alumina-iron oxide (U.S. Pat. No. 6,599,429), manganese and iron-doped titania- and zirconium-oxides (U.S. Pat. No. 8,216,543).

Broad use of selective inorganic adsorbents for water defluoridation and arsenic removal, eutrofication prevention, treatment of industrial streams, and in different applications in the medicine and food industries is absent in the art, and requires further investigation for cost-efficient materials with enhanced adsorption performance.

SUMMARY OF THE INVENTION

Bearing in mind the problems and deficiencies of the prior art, it is therefore an object of the present invention to provide an adsorbent useable for selective removal of fluoride ions and oxyanions of phosphorus and arsenic from drinking water, industrial streams and wastes, particularly in the medicine and food industries.

It is another object of the present invention to provide an adsorbent having an affinity towards As(V) and As(III).

The above and other objects, which will be apparent to those skilled in the art, are achieved in the present invention which is directed to an adsorbent for fluoride ion and oxyanions of arsenic and phosphorus, comprising mixed oxide containing alumina in tetra-, penta-, and octahedral coordination or any combination thereof, and a polyvalent metal oxide including titanium, zirconium, tin, cerium, lanthanum, iron, or any combination of thereof.

The content of the alumina in the mixed oxide is from about 20 wt % to about 80 wt %, or about 50 wt % to about 80 wt %. An amount of pentahedrally coordinated alumina is preferably from about 10% to about 30% by weight, and an amount of tetrahedrally coordinated alumina is preferably from about 5% to about 15% by weight.

The mixed oxides may adsorb arsenic(V) and arsenic(III) species. The mixed oxide does not show phase segregation and remains amorphous up to 500° C. The mixed oxide shows adsorption capacity decrease less than 40% after calcination. The mixed oxide has capacity on fluoride ion from about 40 mg F/g to about 80 mg F/g at pH range from 7 to 6, respectively.

The mixed oxide capacity on fluoride ion does not decrease more than 30% in the presence of competitive ions that are approximately 10 to 100 times in excess, the competitive ions including $HCO_3$, Cl, $NO_3$, $SO_4$, or any combination of thereof.

The mixed oxide capacity on fluoride ion does not decrease more than 40% in the presence of equimolar amounts of phosphate, silicate ions, or any combination of thereof.

The mixed oxide has a higher affinity towards phosphate ions than arsenic ions.

The mixed oxide has a separation factor ratio of phosphorus/arsenic from about 1.2 to about 2 in equimolar solutions. The mixed oxide may have an adsorption capacity on $PO_4$ ions from hemo-dialysate solution at a pH level of about 5 to 6 of at least 160 mg $PO_4$/g.

The mixed oxide may have an adsorption capacity on $PO_4$ ions from peritoneal dialysate solution at a pH level of about 7 to 8 of at least 100 mg $PO_4$/g. The mixed oxide is thermally stable, and has an adsorption capacity decrease of less than 40% after calcination.

In a second aspect, the present invention is directed to a method of making an adsorbent comprising precipitation of mixed oxide by a reaction between a solution or a slurry including a water soluble compound, a polyvalent metal compound, and a base solution in the pH range from about 4 to about 10, ageing the precipitate in mother liquor at the pH level of precipitation, washing the precipitate with water, and drying the precipitate.

The adsorbent is preferably alumina-based, and the water soluble compound is preferably an aluminum compound comprising aluminum sulfate, aluminum chloride, aluminum nitrate, or any combination thereof. The water soluble compound may further be comprised of an aluminum oxide pseudo-sol.

The polyvalent metal compound comprises water soluble nitrates, chlorides, sulfates of titanium, zirconium, tin, cerium, lanthanum, iron, or combinations thereof. The polyvalent metal compound may comprise a sol of titanium, zirconium, tin, cerium, lanthanum, iron, or combinations thereof.

The polyvalent metal compound may comprise nano-sized titanium, zirconium, tin, cerium, lanthanum, iron oxides, or combinations thereof.

The precipitation is carried out at a constant pH level in the range 4-10 under batch or continuous flow conditions by using a base including alkali hydroxides, ammonium hydroxide, alkali carbonates, ammonium carbonate, or combinations thereof.

The precipitation may also be carried out at a pH level changing from acidic to about 4-10 under batch conditions by addition of a base reagent including alkali hydroxides, ammonium hydroxide, alkali carbonates, ammonium carbonate, or combinations thereof.

The precipitate is aged in mother liquor at a pH level of precipitation at ambient or elevated temperature for 1-3 hours.

The adsorbent may include combining 147 g of $Al(NO_3)_3*9H_2O$, 10 g of anatase $TiO_2$, and 400 g of deionized water, with NaOH at 25 wt % solution and water at the pH level of precipitation from about 4 to about 10, such that the adsorbent, when dried, contains approximately 66.6% $Al_2O_3$ and 33.4% $TiO_2$.

The adsorbent may include combining 100 g of 20% aluminum hydroxide pseudo-solution, 10 g of rutile $TiO_2$ and 300 g of deionized water, with 25 wt % solution and water at the pH level of precipitation of about 7, such that the adsorbent contains approximately 66.6% $Al_2O_3$ and 33.4% $TiO_2$.

The adsorbent may include combining 130.6 g of $Al_2(SO_4)_3*18H_2O$, 100 g of a 20 wt % $ZrOCl_2$ solution on $ZrO_2$, and 400 g of deionized water, with 25 wt % solution of NaOH and water at a constant pH level of 7, such that the adsorbent contains approximately 50% $Al_2O_3$ and 50% $ZrO_2$.

The adsorbent may include combining 130.6 g of $Al_2(SO_4)_3*18H_2O$, 100 g of a 20 wt % $La(NO_3)3$ (on $La_2O_3$) solution, and 400 g of deionized water, with 25 wt % solution of NaOH and water at a constant pH level of 7, such that the adsorbent contains approximately 50% $Al_2O_3$ and 50% $La_2O_3$.

The adsorbent may include combining 130.6 g of $Al_2(SO_4)_3*18H_2O$, 67.5 g of $FeCl_3*6H_2O$, and 400 g of deionized water, with 25 wt % solution of NaOH and water at a constant pH level of 7, such that the adsorbent contains approximately 50% $Al_2O_3$ and 50% $Fe_2O_3$.

In a third aspect, the present invention is directed to a method of making an alumina titania mixed oxide adsorbent comprising: forming a metal containing solution by mixing $Al_2(SO_4)_3*18H_2O$, 15.0 wt % titanyl sulfate solution on $TiO_2$, and deionized water; adding simultaneously the metal containing solution and 25 wt % solution of NaOH with water at a predetermined flow rate, allowing for a constant pH level; aging a precipitate of the alumina titania mixed oxide in mother-liquor at ambient temperature; separating the precipitate from the mother-liquor by filtration; washing the precipitate with deionized water to form a wet cake; and drying the wet cake.

The step of forming a metal containing solution includes mixing 130.6 g of $Al_2(SO_4)_3*18H_2O$, 133 g of 15.0 wt % titanyl sulfate solution on $TiO_2$, and 400 g of deionized water.

The step of adding simultaneously the metal containing solution and 25 wt % solution of NaOH with water includes adding 800 ml of the water.

The step of aging the precipitate includes exposing the precipitate to ambient temperature for one hour.

In a fourth aspect, the present invention is directed to a method of making an adsorbent comprising: forming a metal containing solution by mixing $AlCl_3*6H_2O$, 15.0 wt % titanyl sulfate solution on $TiO_2$, and deionized water; adding the metal containing solution and 25 wt % solution of NaOH with water at a predetermined flow rate, allowing for a constant pH level in the reaction mixture; aging a precipitate of the alumina titania mixed oxide in mother-liquor at ambient temperature; separating the precipitate from the mother-liquor by filtration; washing the precipitate with deionized water to form a wet cake; and drying the wet cake.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
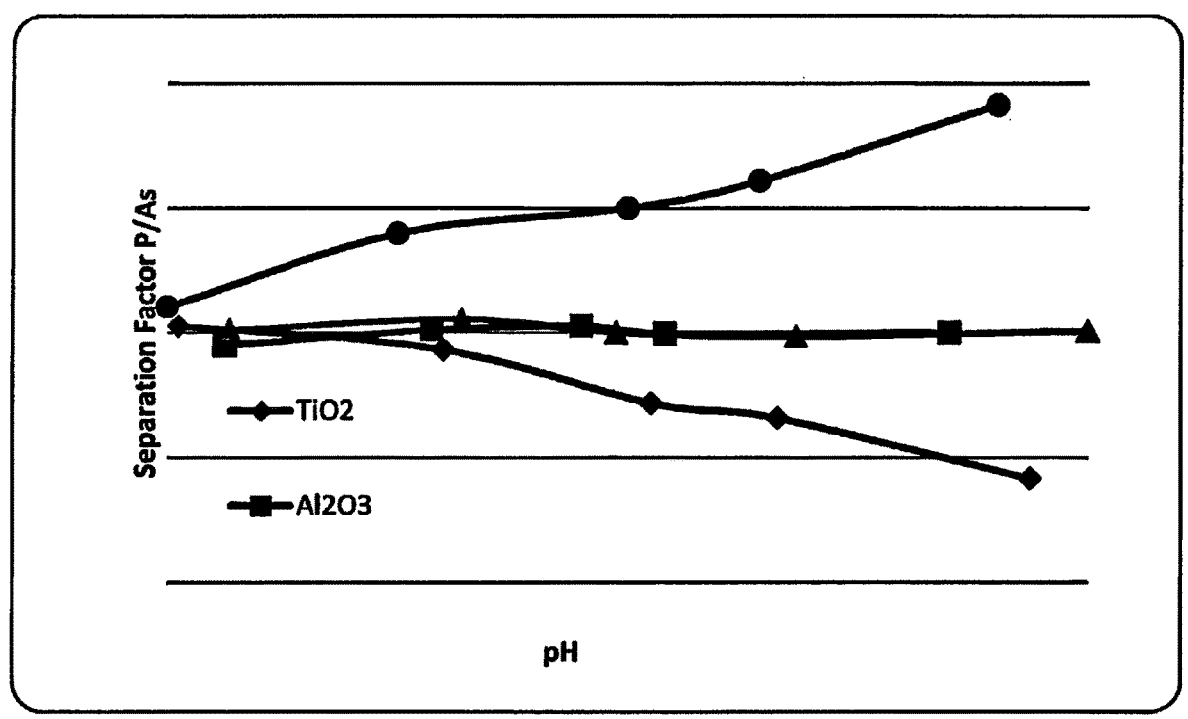
FIG. 1 graphs P/A separation factors calculated from adsorption capacities on As and P as a function of equilibrium pH on hydrous titanium oxide, hydrated ferric oxide, aluminum hydroxide, and the mixed oxide 33.4% $TiO_2$-66.6% $Al_2O_3$ from Example 3; and Fluoride breakthrough curves are presented in FIG. 2 for the alumina based mixed oxide made in Example 3.

In describing the preferred embodiment of the present invention, reference will be made herein to FIGS. 1-2 of the drawings in which like numerals refer to like features of the invention.

The deficiencies of the prior art as discussed above can be alleviated or overcome by the adsorbent of the present invention. The present invention is directed to a high capacity mixed oxide adsorbent comprising alumina that exists in tetra-, penta-, and octahedral coordination, and a polyvalent metal oxide selected from the group of titanium, zirconium, tin, cerium, lanthanum, iron, or any combination thereof, that can be used for simultaneous selective removal of fluoride ion and oxyanions of phosphorus, arsenic(V) and arsenic(III) from different aqueous streams.

Mixed oxide adsorbent is an amorphous material that contains from about 20 wt % up to about 80 wt % of alumina, or preferably from about 50% to about 80% of alumina, in which aluminum exists in octahedral, pentahedral, and tetrahedral coordination, wherein the amount of pentahedrally coordinated aluminum is from about 10% to about 30%, and tetrahedrally coordinated aluminum is from about 5% to about 15%.

The unexpected result of the present invention is a strong synergism between all elements in the mixed oxide composition resulting in a significant increase of media adsorption capacity towards fluoride ion and oxyanions of phosphorus and arsenic in comparison with alumina hydroxide or activated alumina (on the order of twice to six times greater), as well as with other individual polyvalent metal oxides tested under similar conditions. Aluminum hydroxides are able to adsorb arsenic(V) and have no affinity towards arsenic(III), and alumina-based mixed oxides of present invention are able to remove both arsenic(V) and arsenic(III) species with a significant capacity increase only for arsenic(V).

There appears to be little synergistic affect towards other oxyanions like silicate, chromate, sulfate, and the like. The proposed mixed oxide has capacity on fluoride ion from about 40 mg F/g up to about 80 mg F/g at a pH range of approximately 7 to 6, respectively. Advantageously, the adsorbent's capacity on the fluoride ion does not decrease more than 30% in the presence of competitive ions that are approximately 10 to approximately 100 times in excess. The competitive ions typically include $HCO_3$, Cl, $NO_3$, $SO_4$, or any such combination, and do not decrease more than 40% in the presence of equimolar amounts of phosphate, silicate ions, or their combination.

Alumina based mixed oxide has higher affinity towards phosphate ion over arsenic ions with a separation factor for phosphorus/arsenic from approximately 1.2 to about 2 in equimolar solutions. Individual polyvalent metal oxides do not show preferences in uptake of these ions, and may preferably remove arsenic ions, like hydrous titanium oxide. The measured alumina based adsorbent capacity on the $PO_4$ ion from hemo-dialysate solution at a pH level of about 5-6 is at least 160 mg $PO_4$/g, and at least 100 mg $PO_4$/g from a peritoneal dialysate solution at a pH level of about 7-8, which makes it an efficient phosphate scavenger in such applications as, for example, artificial kidney devices.

Another advantage of the present invention is that mixed oxide is a thermally stable adsorbent and has an adsorption capacity decrease of less than 40% (after calcination at 450° C. for 2 hours).

In another embodiment of the present invention, a method of making the aforementioned alumina-based mixed oxides is taught. The method requires a reaction between a solution or a slurry containing an aluminum compound, a polyvalent metal compound, and a base solution in the pH range of approximately 4 to about 10, ageing freshly formed precipitate in mother-liquor (a residual liquid resulting from the crystallization and remaining after the substances that readily or regularly crystallize have been removed) at the pH level of precipitation, washing the precipitate with water, and subsequently drying precipitate.

Specific to the method of forming the aluminum compound, a water soluble compound is chosen, preferably including aluminum sulfate, aluminum chloride, aluminum nitrate, and combinations thereof, or aluminum oxide pseudo-sol. The polyvalent metal compound preferably comprises water soluble nitrates, chlorides, sulfates of titanium, zirconium, tin, cerium, lanthanum, iron, or combinations thereof, or sol of titanium, zirconium, tin, cerium, lanthanum, iron, or combinations thereof. Additionally, polyvalent metal compound may comprise nano sized titanium, zirconium, tin, cerium, lanthanum, iron oxides, or combinations thereof.

Another feature of the method of the present invention is that precipitation may be carried out at a constant pH level, which is kept in the range of 4-10 under batch or continuous flow conditions by using base chosen from alkali hydroxides, ammonium hydroxide, alkali carbonates, ammonium carbonate, and combinations thereof.

The precipitation may be carried at a pH level changing from acidic to about 4-10 under batch conditions by the addition of a base reagent chosen from alkali hydroxides, ammonium hydroxide, alkali carbonates, ammonium carbonate, or combinations thereof.

On the final stage freshly formed alumina based mixed oxide precipitate is aged in mother-liquor at the pH level of precipitation at ambient or elevated temperature for 1-3 hours and then dried.

The present invention is described more specifically by reference to the following exemplary embodiments, which are not intended to limit the invention described in the appended claims.

Example 1

In a first exemplary embodiment, preparation of a metal containing solution of the present invention involves mixing 130.6 g of $Al_2(SO_4)3*18H_2O$, 133 g of a 15.0 wt % titanyl sulfate solution (on $TiO_2$), and 400 g of deionized water. Metal containing solution and 25 wt % solution of NaOH are added simultaneously into a 2 L glass beaker filled with 800 mL of water with the use of a peristaltic pump at a predetermined flow rate which allows for a constant pH level of 5 in the reaction mixture, the pH level being constant throughout the precipitation process. Next, the precipitate of alumina titania mixed oxide is aged in mother-liquor at ambient temperature for 1 hour, and then the aged precipitate is separated from mother-liquor by filtration and washed with deionized water. The wet cake is then dried at 100° C. in air for approximately 18 hours. The dry adsorbent contains 50% $Al_2O_3$ and 50% $TiO_2$.

Example 2

In a second exemplary embodiment, preparation of the metal containing solution comprises mixing 130.6 g of $Al_2(SO_4)3*18H_2O$, 133 g of a 15.0 wt % titanyl sulfate solution (on $TiO_2$), and 400 g of deionized water. The metal containing solution and 25 wt % solution of NaOH are then added simultaneously into a 2 L glass beaker filled with 800 mL of water with the use of peristaltic pump at a predetermined flow rate that maintains a constant pH level at about 9 in the reaction mixture throughout precipitation process. Next, the precipitate of alumina titania mixed oxide is aged in mother-liquor at ambient temperature for 1 hour and then the aged precipitate is separated from mother-liquor by filtration and washed with deionized water. The wet cake is dried at 100° C. in air for 18 hours. The resultant dry adsorbent contains 50% $Al_2O_3$ and 50% $TiO_2$.

Example 3

In a third exemplary embodiment, preparation of a metal containing solution comprises mixing 94.5 g of $AlCl_3*6H_2O$, 66.5 g of a 15.0 wt % titanyl sulfate solution (on $TiO_2$), and 400 g of deionized water. NaOH at 25 wt % solution is slowly added to a beaker with the metal containing solution until the pH level reaches 7. Next, the precipitate of alumina titania mixed oxide is aged in mother-liquor at ambient temperature for 3 hours and then the aged precipitate is separated from mother-liquor by filtration and washed with deionized water. The wet cake was dried at 100° C. in air for 18 hours. The dry adsorbent contains approximately 66.6% $Al_2O_3$ and 33.4% $TiO_2$.

Example 4

In a fourth exemplary embodiment, preparation of a metal containing solution comprises mixing 147 g of $Al(NO_3)3*9H_2O$, 10 g of anatase $TiO_2$, and 400 g of deionized water. NaOH at 25 wt % solution is slowly added to a beaker with metal containing solution until a pH level of approximately 7 is reached. Next, the precipitate of alumina titania mixed oxide is aged in mother-liquor at ambient temperature for 3 hours, and then the aged precipitate is separated from mother-liquor by filtration, and washed with deionized water. The wet cake is then dried at 100° C. in air for 18 hours. The dry adsorbent contains approximately 66.6% $Al_2O_3$ and 33.4% $TiO_2$.

Example 5

In a fifth exemplary embodiment, the preparation of a metal containing solution comprises mixing 100 g of 20% aluminum hydroxide pseudo-solution, 10 g of rutile $TiO_2$ and 300 g of deionized water. A 25 wt % solution of NaOH is added slowly to a beaker with the metal containing solution until the pH level reaches approximately 7. Next, the precipitate of alumina titania mixed oxide is aged in mother-liquor at ambient temperature for 3 hours, and then the aged precipitate is separated from mother-liquor by filtration, and washed with deionized water. The wet cake is dried at 100° C. in air for 18 hours. The dry adsorbent contains 66.6% $Al_2O_3$ and 33.4% $TiO_2$.

Example 6

In a sixth exemplary embodiment, the preparation of a metal containing solution comprises mixing 130.6 g of $Al_2(SO_4)3*18H_2O$, 100 g of a 20 wt % $ZrOCl_2$ solution (on $ZrO_2$), and 400 g of deionized water. The metal containing solution and 25 wt % solution of NaOH are added simultaneously into a 2 L glass beaker filled with 800 mL of water with the use of peristaltic pump at a predetermined flow rate to maintain a constant pH level of 7 in the reaction mixture throughout precipitation process. Next, the precipitate of alumina zirconia mixed oxide is aged aged in mother-liquor at ambient temperature for 1 hour, and then the aged precipitate is separated from mother-liquor by filtration, and washed with deionized water. The wet cake is dried at 100° C. in air for 18 hours. The dry adsorbent contains 50% $Al_2O_3$ and 50% $ZrO_2$.

Example 7

In a seventh exemplary embodiment, a preparation of metal containing solution comprises mixing 130.6 g of $Al_2(SO_4)3*18H_2O$, 100 g of a 20 wt % $La(NO_3)3$ (on $La_2O_3$) solution, and 400 g of deionized water. The metal containing solution and 25 wt % solution of NaOH are added simultaneously into a 2 L glass beaker filled with 800 mL of water with the use of peristaltic pump at a predetermined flow rate to maintain a constant pH level of 7 in the reaction mixture throughout precipitation process. Next, the precipitate of alumina lanthanum mixed oxide is aged in mother-liquor at ambient temperature for 1 hour, and then the aged precipitate is separated from mother-liquor by filtration, and washed with deionized water. The wet cake is dried at 100° C. in air for 18 hours. The dry adsorbent contains 50% $Al_2O_3$ and 50% $La_2O_3$.

Example 8

In an eighth exemplary embodiment, the preparation of a metal containing solution comprises mixing 130.6 g of $Al_2(SO_4)3*18 H_2O$, 67.5 g of $FeCl_3*6H_2O$, and 400 g of deionized water. The metal containing solution and 25 wt % solution of NaOH is added simultaneously into a 2 L glass beaker filled with 800 mL of water with the use of peristaltic pump at a predetermined flow rate maintaining a constant pH level of approximately 7 in the reaction mixture throughout precipitation process. Next, the precipitate of alumina iron mixed oxide is aged in mother-liquor at ambient temperature for 1 hour, and then the aged precipitate is separated from mother-liquor by filtration, and washed with deionized water. The wet cake is dried at 100° C. in air for 18 hours. The dry adsorbent contains 50% $Al_2O_3$ and 50% $Fe_2O_3$.

Example 9

The Al-27 MAS NMR spectra of freshly prepared alumina hydroxide and alumina based mixed oxides have been recorded on a Bruker Avance III 400 MHz spectrometer.

| Sample | Octahedral Al, % | Pentahedral Al, % | Tetrahedral Al, % |
| --- | --- | --- | --- |
| $Al(OH)_3$ | 100 | 0 | 0 |
| 50% $Al_2O_3$ - 50% $TiO_2$ Example 2 | 80 | 15 | 5 |
| 50% $Al_2O_3$ - 50% $ZrO_2$ Example 6 | 60 | 25 | 15 |
| 50% $Al_2O_3$ - 50% $Fe_2O_3$ Example 8 | 80 | 15 | 5 |
| 67% $Al_2O_3$ - 33% $TiO_2$ Example 3 | 70 | 70 | 10 |

Example 10

Adsorption experiments have been carried out under batch conditions with a contact time 18 hours. The following test solutions were used in the adsorption experiments:
 a) Fluoride ion—10 ppm F+2 mM $NaHCO_3$+2 mM $Na_2SO_4$, pH=6;
 b) Phosphate ion—0.83 ppm P+2 mM $NaHCO_3$, pH=8; and
 c) Arsenate ion—2 ppm As+2 mM $NaHCO_3$, pH=8.

Commercial adsorbents, such as those from GFO (Bayer), MetSorb (Graver Technologies) and activated alumina AA400, have been used for a comparison study.

TABLE I

Ion Exchange Capacities (IEC) of Test Ions on Alumina Based Mixed Oxides

| Sorbent | IEC-F, mg/g | IEC - $PO_4$, mg/g | IEC - $AsO_4$, mg/g |
|---|---|---|---|
| Example 1 | 75 | 55 | 65 |
| Example 2 | 70 | 55 | 70 |
| Example 3 | 70 | 50 | 60 |
| Example 4 | 65 | 50 | 60 |
| Example 5 | 65 | 50 | 60 |
| Example 6 | 75 | 55 | 70 |
| Example 7 | 80 | 60 | 65 |
| Example 8 | 65 | 50 | 65 |
| GFO, Granular Ferric Oxide | 10 | 12 | 20 |
| MetSorb $TiO_2$ | 12 | 10.5 | 17 |
| Activated Alumina AA400 | 15 | 7 | 7 |

Example 11

Adsorption experiments have been carried out under batch conditions with a contact time 18 hours. The following equimolar test solutions were used in adsorption experiments:

a) Phosphate ion—0.83 ppm P+2 mM $NaHCO_3$, pH=8; and b) Arsenate ion—2 ppm As+2 mM $NaHCO_3$, pH=8

Figure 2:
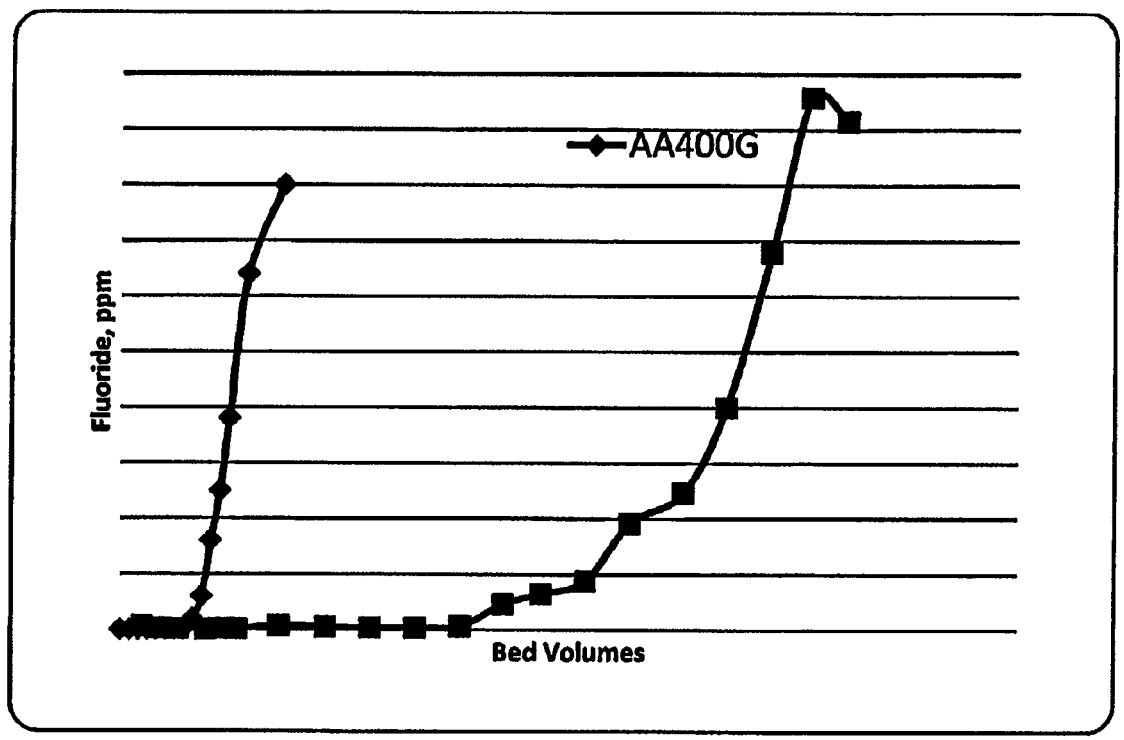

Adsorption capacities on As and P as a function of equilibrium pH on hydrous titanium oxide, hydrated ferric oxide, aluminum hydroxide, and mixed oxide 33.4% $TiO_2$-66.6% $Al_2O_3$ from Example 3 have been determined and P/As separation factors have been calculated from experimental data according to formula:

SF=IEC-P/IEC-As (at fixed pH), and presented in FIG. 1. As seen $Fe_2O_3$ and $Al_2O_3$ do not show selectivity to $AsO_4$ or $PO_4$ in the pH range 6-10, whereas anatase $TiO_2$ exhibits affinity towards $AsO_4$ at a pH level of greater than or equal to 7. Alumina based mixed $TiO_2$—$Al_2O_3$ shows distinct affinity towards phosphate ion over arsenate ion in the tested pH range. The separation factor P/As for this media increases with an increase of equilibrium pH reaching a value of 1.5 at a pH=8, and 1.9 at a pH=9.7.

Example 12

The alumina based mixed oxide made in Example 3 (66.6% $Al_2O_3$-33.4% $TiO_2$, particle size 45-75 µm) and activated alumina 400 G (particle size 45-75 µm) were tested for fluoride ion removal from tap water spiked with 6.2 ppm F and pH=7.5 under column conditions. In both cases two grams of adsorbent were placed in a glass column with inner diameter 8 mm and test solution was passed through an adsorbent bed with flow rate 80 BV/hr. Fluoride breakthrough curves are presented in FIG. 2. As seen, alumina-based adsorbent from Example 3 (purifies ~3,300 BV) outperform the benchmark activated alumina 400 G (purifies ~500 BV) before breakthrough (1.5 ppm F) more than 6 times.

Example 13

The effect of competitive ions on fluoride ion sorption on mixed oxide of Example 1 is shown in the Table II. Initial concentration of fluoride ion in all test solutions was 10 ppm and contact time was 18 hours.

TABLE II

Effect of Competitive Ions on Fluoride Ion Sorption on Alumina-Titania Mixed Oxide

| Competitive ion | Ion Excess, times | IEC-F, mg/g |
|---|---|---|
| — | — | 75 |
| $HCO_3$ | 5 | 65 |
| Cl | 50 | 70 |
| $SO_4$ | 25 | 65 |
| $SiO_3$ | 4 | 45 |
| $PO_4$ | 1 | 45 |

Example 14

Effect of thermal treatment on $AsO_4$ ion sorption on mixed oxide of Example 1 is shown in the Table III. The arsenic test solution contained 2 ppm As(V), pH=8. The fluoride test solution contained 10 ppm F in tap water, pH=7.5. The contact time was 18 hours.

TABLE III

Effect of Thermal Treatment on $AsO_4$ and F Ion Uptake by Alumina-Titania Adsorbent

| Ion | IEC 100° C., mg/g | IEC 250° C., mg/g | IEC 350° C., mg/g | IEC 450° C., mg/g |
|---|---|---|---|---|
| $AsO_4$ | 75 | 65 | 60 | 50 |
| F | 25 | 21 | 19 | 18 |

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of making an adsorbent comprising precipitation of mixed metal oxide having a ratio of $Al_2O_3$ and $TiO_2$ with a transition metal oxide, $Z_yO_x$, where $Z_y$ represents a transition metal including iron, zirconium, or tin, and the addition of said transition metal is less than 10% by weight, said precipitation by a reaction between a solution or a slurry of an aluminum salt, a solution or slurry mixture of $TiO_2$ and/or titanyl sulfate, which together forms an acid, and a base of an alkali carbonate, ammonium carbonate, alkali metal hydroxide, or alkali earth metal hydroxide, neutralizing a combined mixture of said acid and said base in a pH range from 4 to 10, forming an alumina titania precipitate, ageing said precipitate in mother liquor at the pH level of precipitation and at ambient or elevated temperature for 1-3 hours, washing the precipitate with water, and drying said precipitate.

2. The method of claim 1 wherein said adsorbent is alumina-based, and said solution or slurry of aluminum salt is an aluminum compound comprising aluminum sulfate, aluminum chloride, aluminum nitrate, or any combination thereof.

3. The method of claim 1 wherein said solution or slurry of aluminum salt comprises an aluminum oxide pseudo-sol.

4. The method of claim 1 wherein said transition metal oxide further comprises water soluble nitrates, chlorides, sulfates of titanium, zirconium, tin, iron, or combinations thereof.

5. The method of claim 1 wherein said adsorbent further comprises a sol of titanium, zirconium, tin, iron, or combinations thereof.

6. The method of claim 1 wherein said adsorbent further comprises nano-sized titanium, zirconium, tin, iron oxides, or combinations thereof.

7. The method of claim 1 wherein said precipitation is carried out at a constant pH level in the range 4-10 under batch or continuous flow conditions by using a base including alkali hydroxides, ammonium hydroxide, alkali carbonates, ammonium carbonate, or combinations thereof.

8. The method of claim 1 wherein said precipitation is carried out at a pH level changing to be in the range of about 4-10 under batch conditions by addition of a base reagent including alkali hydroxides, ammonium hydroxide, alkali carbonates, ammonium carbonate, or combinations thereof.

9. A method of making an adsorbent comprising precipitation of mixed metal oxide having a ratio of $Al_2O_3$ and $TiO_2$, or having a ratio of $Al_2O_3$ and $TiO_2$ with a transition metal oxide, $Z_yO_x$, where $Z_y$ represents a transition metal including iron, zirconium, or tin, and the addition of said transition metal is less than 10% by weight, said precipitation by a reaction between a solution or a slurry of an aluminum salt, a solution or slurry mixture of $TiO_2$ and/or titanyl sulfate, which together forms an acid, and a base of an alkali carbonate, ammonium carbonate, alkali metal hydroxide, or alkali earth metal hydroxide, neutralizing a combined mixture of said acid and said base in a pH range from 4 to 10, forming an alumina titania precipitate, ageing said precipitate in mother liquor at the pH level of precipitation and at ambient or elevated temperature for 1-3 hours, washing the precipitate with water, and drying said precipitate; wherein said adsorbent includes combining 130.6 g of $Al_2(SO_4)3*18H_2O$, 100 g of a 20 wt % $ZrOCl_2$ solution on $ZrO_2$, and 400 g of deionized water, with 25 wt % solution of NaOH and water at a constant pH level of 7, and an insubstantial amount of $TiO_2$.

10. A method of making an adsorbent comprising precipitation of mixed metal oxide having a ratio of $Al_2O_3$ and $TiO_2$, or having a ratio of $Al_2O_3$ and $TiO_2$ with a transition metal oxide, $Z_yO_x$, where $Z_y$ represents a transition metal including iron, zirconium, or tin, and the addition of said transition metal is less than 10% by weight, said precipitation by a reaction between a solution or a slurry of an aluminum salt, a solution or slurry mixture of $TiO_2$ and/or titanyl sulfate, which together forms an acid, and a base of an alkali carbonate, ammonium carbonate, alkali metal hydroxide, or alkali earth metal hydroxide, neutralizing a combined mixture of said acid and said base in a pH range from 4 to 10, forming an alumina titania precipitate, ageing said precipitate in mother liquor at the pH level of precipitation and at ambient or elevated temperature for 1-3 hours, washing the precipitate with water, and drying said precipitate; wherein said adsorbent includes combining 130.6 g of $Al_2(SO_4)3*18H_2O$, 67.5 g of $FeCl_3*6H_2O$, and 400 g of deionized water, with 25 wt % solution of NaOH and water at a constant pH level of 7, and an insubstantial amount of $TiO_2$.

\* \* \* \* \*